US012722960B2

(12) United States Patent
Eyler, Jr.

(10) Patent No.: US 12,722,960 B2
(45) Date of Patent: Sep. 1, 2026

(54) CLAMPING TOOL FOR MANWAY COVER AND RELATED METHODS

(71) Applicant: Eyler Design Solutions, LLC, Mont Belvieu, TX (US)

(72) Inventor: Robert L. Eyler, Jr., Mont Belvieu, TX (US)

(73) Assignee: Eyler Design Solutions, LLC

( * ) Notice: Subject to any disclaimer, the term of this patent is extended or adjusted under 35 U.S.C. 154(b) by 104 days.

(21) Appl. No.: 18/793,350

(22) Filed: Aug. 2, 2024

(65) Prior Publication Data

US 2026/0035226 A1 Feb. 5, 2026

(51) Int. Cl.
*B66F 19/00* (2006.01)

(52) U.S. Cl.
CPC .................................. *B66F 19/005* (2013.01)

(58) Field of Classification Search
CPC ..................................................... B66F 19/005
See application file for complete search history.

(56) References Cited

U.S. PATENT DOCUMENTS 2,086,318 A * 7/1937 Jackson ................ B66F 19/005 414/451
5,035,336 A 7/1991 Schmitz et al.
6,786,343 B1 * 9/2004 Porebski ............... B66C 23/203 212/166
7,503,743 B1 3/2009 Friedrich
8,763,850 B2 7/2014 Depietro
9,315,303 B2 * 4/2016 Craig ..................... B65D 90/10
2005/0242051 A1 * 11/2005 Porebski ............... B66C 23/203 212/179
2007/0228346 A1 * 10/2007 Beach ................... B66F 19/005 254/131
2014/0283359 A1 * 9/2014 DePietro ................. E02D 29/12 29/466
2017/0349188 A1 * 12/2017 Schmidt ................... B61D 5/08
2018/0005733 A1 1/2018 Shinotake
2023/0219603 A1 * 7/2023 Rogers ..................... B61D 5/08 105/377.07

FOREIGN PATENT DOCUMENTS

GB 2539505 A 12/2016

OTHER PUBLICATIONS

International Search Report and Written Opinion in connection with International Application No. PCT/US2025/039569, dated Nov. 7, 2025, 13 pages.

* cited by examiner

*Primary Examiner* — Michael McCullough
(74) *Attorney, Agent, or Firm* — RPG Law Group; Richard P. Gilly

(57) ABSTRACT

A clamping tool for use with manway covers may be selectively attached to a manway to permit the manway cover to be separated from its opposing manway flange without having to completely disassociate such manway cover with its corresponding manway. One possible arrangement makes use of at least two clamps, a manway cover clamp and a manway flange clamp, each of the clamps having portions which can be inserted between opposing portions of the manway cover and the manway flange. The clamping tool maintains the relative alignment of the manway cover and the manway flange, yet permits the manway to be selectively opened by separating the manway cover from such manway flange, or closed after such opening.

19 Claims, 9 Drawing Sheets

CLAMPING TOOL FOR MANWAY COVER AND RELATED METHODS

FIELD

The present disclosure relates generally to manway covers for access to enclosed spaces, such as tanks, conduits, storage areas, heat exchange air tubes, and the like. The disclosure, more particularly, relates to a tool to assist in separating such manway covers from the associated manway, particularly when such manway covers are too heavy to be handled by an unaided individual.

BACKGROUND

Manway covers are typically large, heavy, metal plates that are bolted to an opening. Manway covers may include any heavy covers or closures used in a wide range of applications, including pressure vessels, vacuum vessels, atmospheric vessels, heat exchangers, heat exchanger channel covers, heat exchanger channels, heat exchanger bonnets, heat exchanger shell covers, dished heads, domed heads, half covers such as on divided water box heat exchangers, chiller condensers, chiller heat exchangers, chiller coolers, inspection ports, or any type of blanking plate. In terms of dimensions, such manway covers may or may not be sized to allow passage of a man. The most common are circularly-shaped and mate to a flange by way of a plurality of bolts evenly spaced around the periphery of the opening. However, it should be understood that the heavy covers may be any shape.

The defined manway covers typically provide access to enclosed spaces such as tanks, conduits, storage areas, transfer tubes, pressure vessels, vacuum vessels, atmospheric vessels, heat exchangers, heat exchanger channel covers, heat exchanger channels, heat exchanger bonnets, and the like. These types of covers are typically found in power plants, co-generation power plants, steam generation plants, chemical plants, petrochemical plants, refineries, pharmaceutical plants, air separation plants, beverage plants, food processing plants, heating and cooling facilities, buildings with central heating and cooling systems, buildings with chiller cooling systems, water treatment plants, waste management plants, dairies, tank farms, gas storage facilities, liquid natural gas storage facilities, manufacturing facilities and or any facility that has tanks, vessels, piping, heat exchangers, chillers, boilers, turbines and/or equipment of similar nature.

Routine servicing and inspection requirements as well as other operating conditions necessitate periodic separation of such manway covers from the associated manway, including removal of these covers from a manway flange to which it is secured. In view of the typical configurations of manways and manway covers, their location, weight, or other access constraints, it is not a simple task to separate such manway covers from the manway or manway flange, such separation including removal of the cover for access to the manway otherwise covered. Likewise, re-attaching or re-installing such covers faces similar challenges.

Current systems and devices associated with separating (or removing) manway covers from manways and their associated manway flanges generally suffer from various drawbacks and disadvantages, which would be advantageous to address.

SUMMARY

In one suitable implementation, a clamping tool may be selectively attached and detached from a manway. Part of the tool engages the manway flange of the manway and another part of the tool engages the manway cover. The clamping tool may have two or more clamps, at least one of which is removably securable to the manway flange and the other of which is removably securable to the manway cover. A frame interconnects the two clamps and has features that allow the clamps to be moveable relative to each other. This permits the manway cover to be separated from the manway flange while retaining the manway cover in proximity to the manway flange. In this way, the clamping tool permits selective separation of the manway cover from the manway flange, so as to open or close the manway. Each of the clamps has respective inner and outer jaws. The clamping tool is configured so that the inner jaws of each of the clamps can be positionable between opposing portions of the manway flange and the manway cover. In one possible implementation, the clamps of the clamping tool are removably securable to the manway by clamp fasteners which are able to engage holes of predetermined size already formed within the manway cover and the manway flange, and preferably without alteration of the predetermined size of such previously formed holes.

In one possible variation, the clamps are secured by means of two of the clamp fasteners located on, and arcuately spaced around, the circumference of the manway flange and the manway cover. The clamp fasteners may be in the form of pins insertable into the previously formed holes of the manway cover or the manway flange.

In another potential implementation, there are three clamp fasteners at arcuately spaced locations, engaging three of the predetermined size holes.

In still further implementations, the interconnection of the two or more clamps may be accomplished by the frame in the form of a davit. The davit may have a mast member and an arm extending orthogonally to the mast member. The mast member is rotatable about an axis of rotation adjacent to the manway, the arm extending adjacent to the manway to swing out from the manway when the mast member is suitably rotated. In such configuration, one of the clamps remains engaged around the opposite planar surfaces of the manway cover, whereas the other of the clamps remains engaged on opposite sides of the edge of the manway flange.

In still other implementations, the two or more clamps may be located at substantially the same arcuate location about the circumference of the manway, and such two clamps are rotatable about a single axis of rotation of a hub. In such implementation, one or both of the jaws of the clamps may be configured to include lips. Such lips, in turn, may be configured so that they have nested side edges, such lips engaging corresponding portions of the manway cover and the manway flange, and abutting each other when the manway is closed, so as to provide additional support while the clamping tool is in use.

BRIEF DESCRIPTION OF THE DRAWINGS

A more complete understanding of the present disclosure, and the attendant advantages and features thereof, will be more readily understood by reference to the following detailed description, when considered in conjunction with the accompanying drawings, wherein.

DETAILED DESCRIPTION

Figure 1:
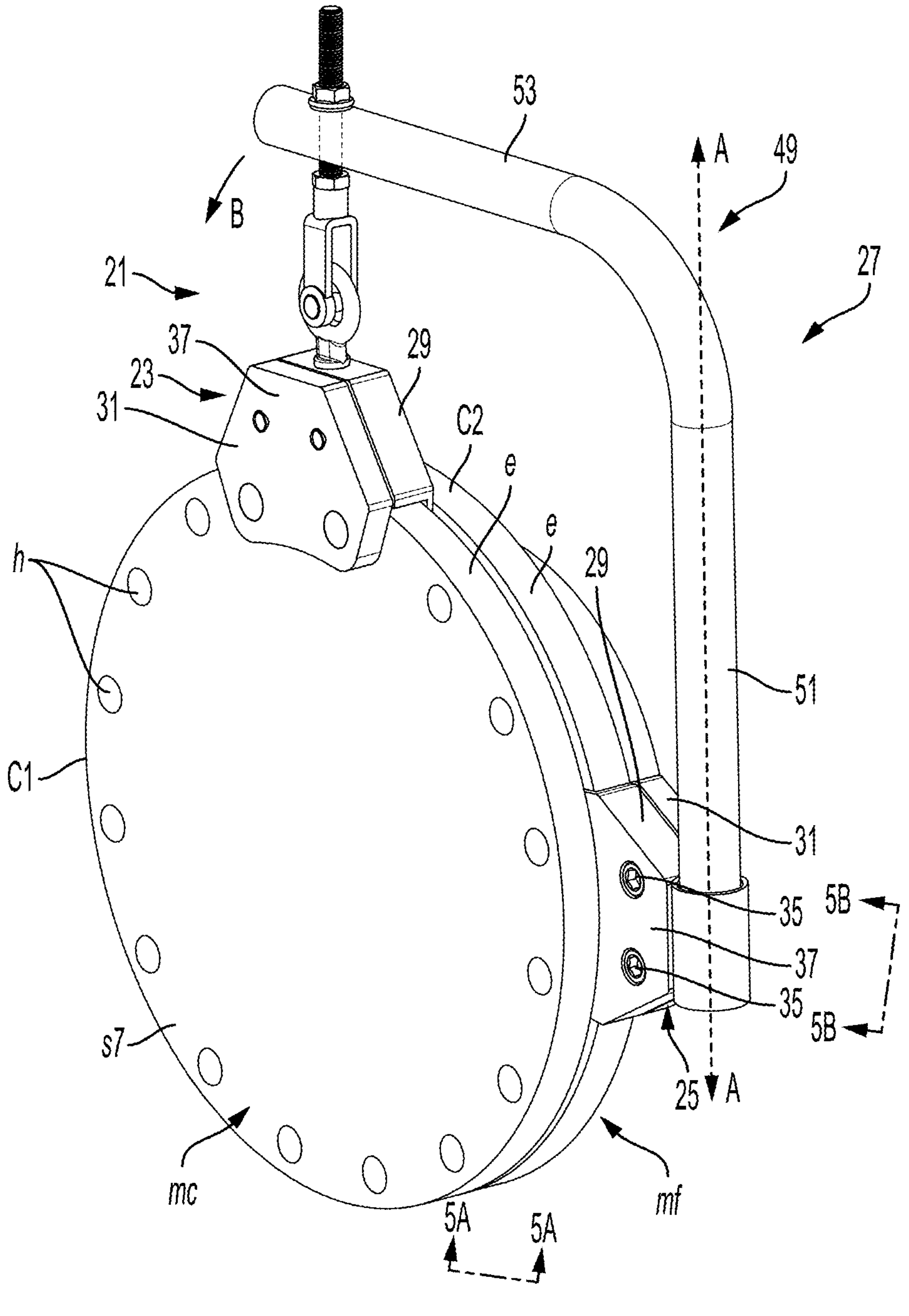
FIG. 1 is an isometric view of one possible implementation of a clamping tool for a manway cover according to the present disclosure.
Figure 2:
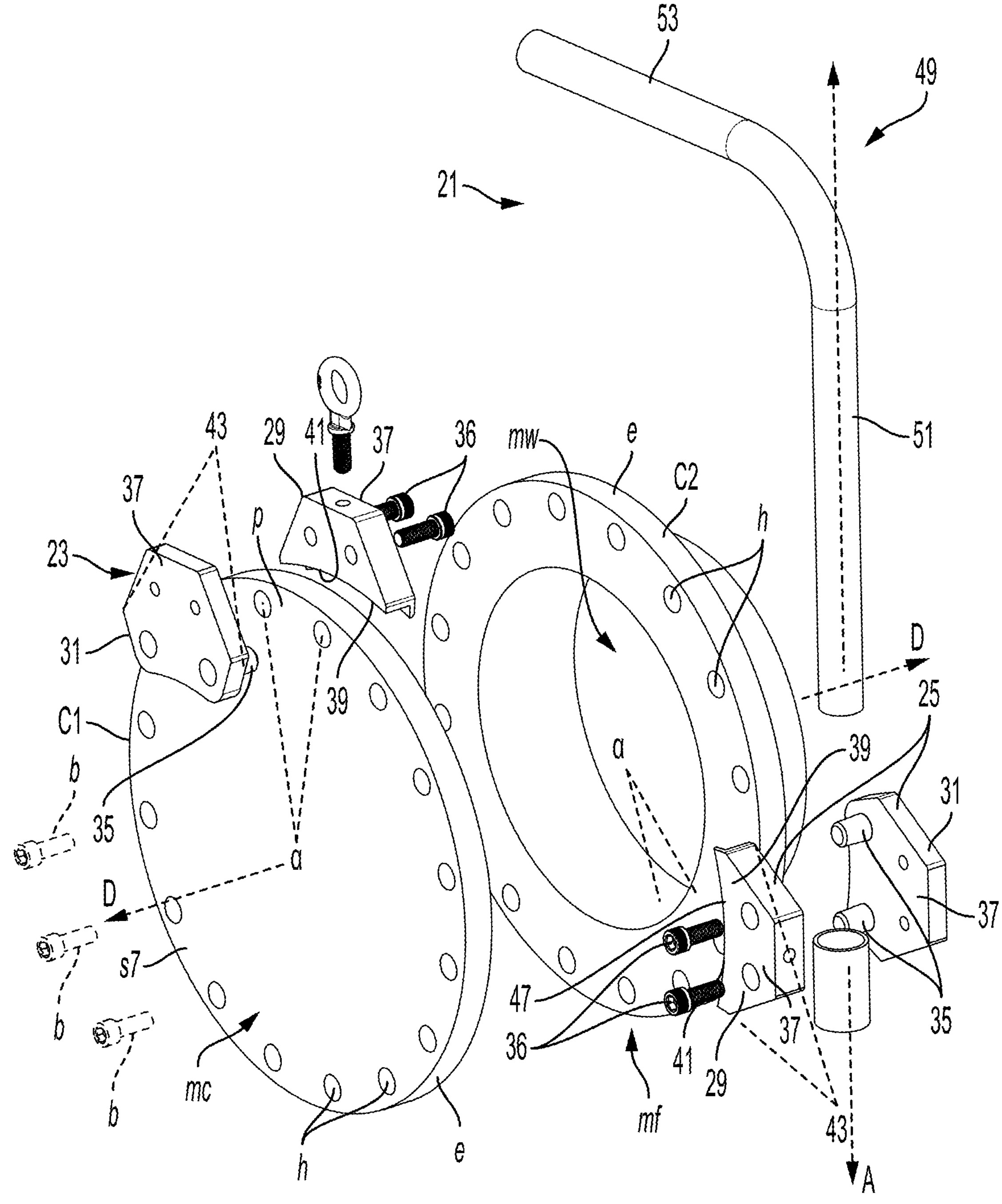
FIG. 2 is an exploded, isometric view of the implementation of the clamping tool of FIG. 1.
Figure 3:
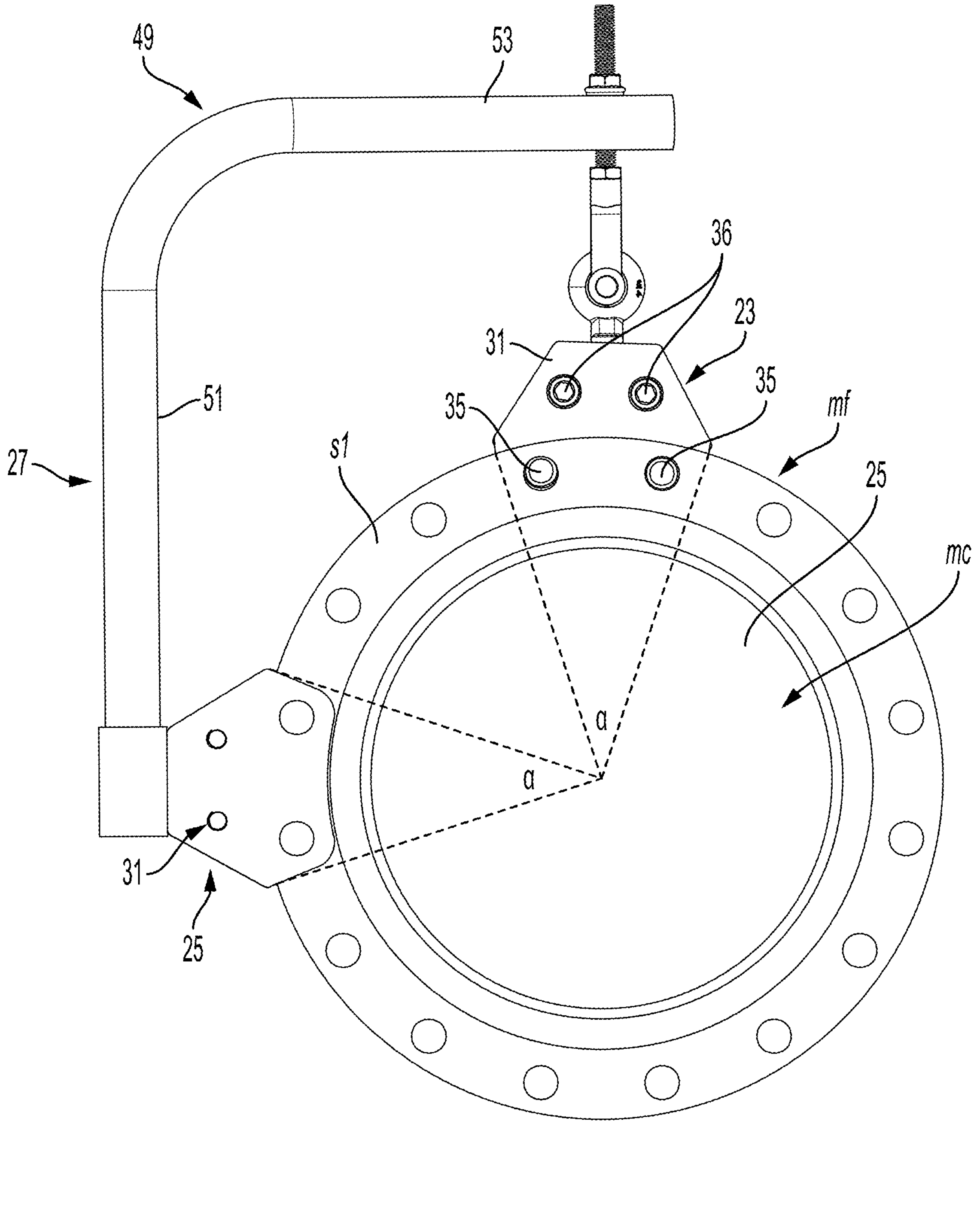
FIG. 3 is a rear, elevational view of the implementation of the clamping tool of FIGS. 1-2.
Figure 4:
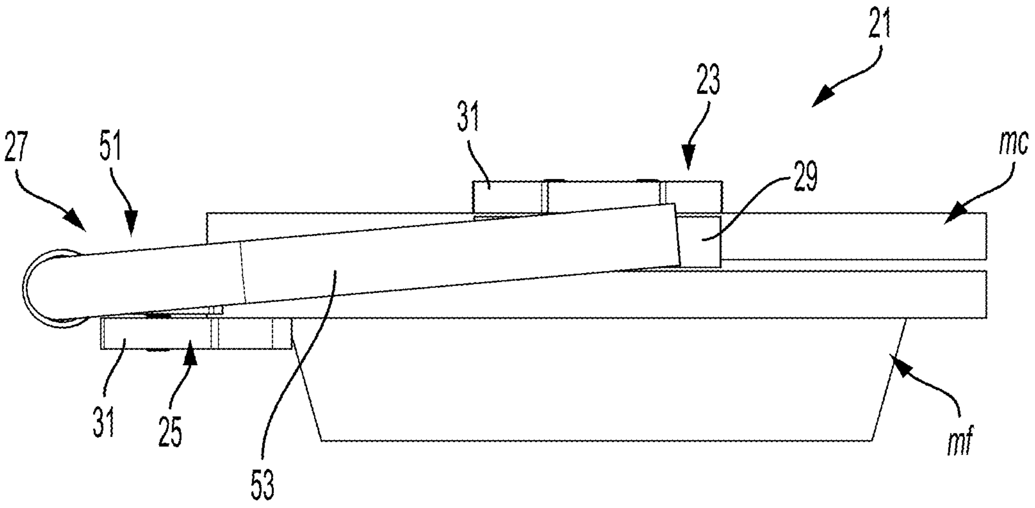
FIG. 4 is a top, plan view of the implementation of the clamping tool of FIGS. 1-3.
Figure 5A:
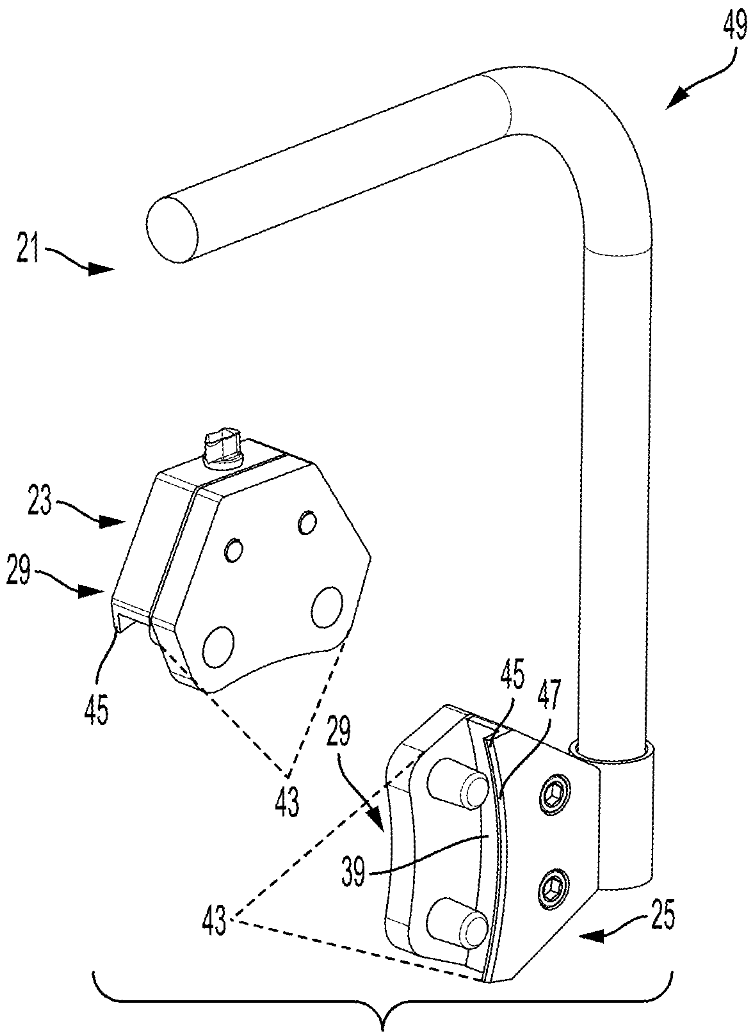
FIG. 5A is a partial, isometric view of certain components of the clamping tool of FIGS. 1-4 taken along line 5A-5A of FIG. 1.
Figure 5B:
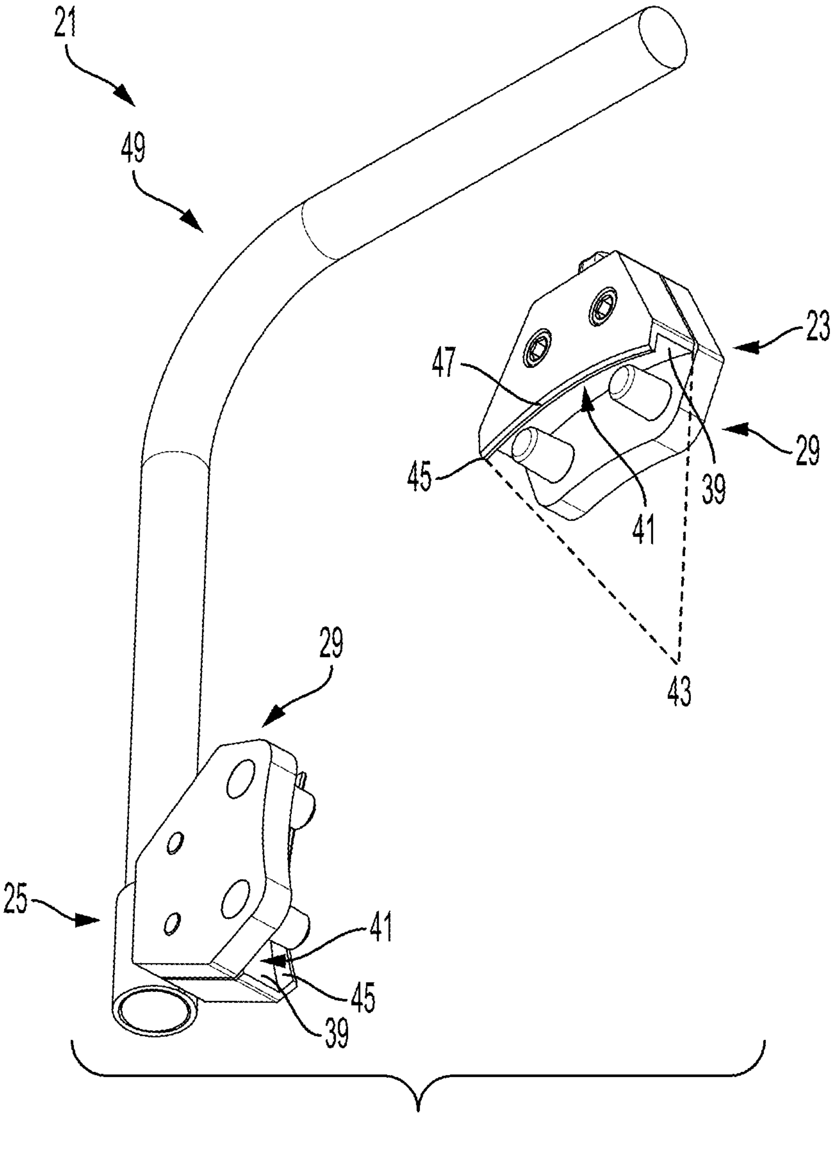
FIG. 5B is another partial, isometric view of certain components of the clamping tool shown in FIGS. 1-5A, taken along line 5B-5B of FIG. 1.

Referring now to the drawings and, in particular to FIGS. 1-4, 5A, and 5B, a clamping tool 21 has been suitably connected to a manway mw to help separate a manway cover mc from an associated manway flange mf. Clamping tool 21 has various components and features, to be detailed herein, to permit separation of manway cover me so as to open manway mw for any suitable purpose, such as gaining access to manway mw.

The various components and features of clamping tool 21 have been configured to work or otherwise interact with certain parts and portions of manway mw, the associated manway flange mf and manway cover mc, preferably with little to no modification of the existing manway and its components. So, for example, in the illustrated implementation of FIGS. 1-4, 5A, 5B, clamping tool 21 includes two clamps, one of which is a cover clamp 23, removably securable to the manway cover mc, whereas the other clamp is a manway flange clamp 25, which is removably securable to manway flange mf. Each of the clamps 23, 25 have respective inner and outer jaws 29, 31.

Inner jaws 29 are among the features of clamping tool 21 which assist in making separation of manway cover mc from manway flange mf relatively straightforward. In the illustration implementation, inner jaw 29 of cover clamp 23 is able to be removably secured to inward surface s5 of manway cover mc, whereas inner jaw 29 of manway flange clamp 25, for its part, is removably securable to a front flange surface s3 of manway flange mf. As such, inner jaws 29 of each of the clamps 23, 25 are able to be positioned between opposing portions of manway flange mf and manway cover mc during associated opening procedures for manway mw.

Outer jaws 31 of each of clamps 23, 25, are located opposite inner jaws 29 and are removably securable, respectively, to outward surface s7 of manway cover mc and rear flange surface s1 of manway flange mf. Clamps 23, 25 therefore retain manway cover mc and manway flange mf between their respective clamp jaws, that is, inner and outer jaws 29, 31, and thus retain manway cover mc in operative proximity to, or in a nearby position relative to, manway flange mf, to permit selective opening, closing, or other partial separation of the two.

Although many variations and implementations are possible, in the clamping tool 21 illustrated in FIGS. 1-4, 5A and 5B, a frame 27 is secured between the two clamps 23, 25, so as to permit selective opening and closing of manway mw, by rotating manway cover mc away from manway flange mf about an adjacent axis. With regard to frame 27, portions of frame 27 are connected to the clamps 23, 25, so that such frame portions are movable relative to each other. Frame 27 may comprise a davit 49, in which such davit 49 has a mast member 51 and a davit arm 53 extending orthogonally relative to mast member 51. Mast member 51 is rotatable about an axis of rotation A, which axis is adjacent manway mw. Arm 53, in turn, extends orthogonally and adjacent to manway mw to swing out therefrom when the mast member 51 is suitably rotated about axis A. Rotation of mast member 51 and its securement relative to manway flange clamp 25 is such that the inner and outer jaws 29, 31 of manway flange clamp 25 open relative to each other from the position shown in FIG. 1, when mast member 51 is rotated about axis A in the direction shown by arrow B.

The shapes and configurations of clamps 23, 25, frame 27, and other components of clamping tool 21 may be varied so as to be connectable to manway flanges and manway covers of any number of configurations. For example, components of clamping tool 21 may be altered for manways having circumferences of any shape or side. So the term circumference, as used herein, applies equally to non-circular or non-ovoid openings, such as a quadrilateral, square, or other polygons, as well as to ovoid or circular circumferences.

Similarly, manway covers may be secured to corresponding manway flanges not only by removable bolts, but also by any number of other instrumentalities. In the illustrated implementations shown in FIGS. 1-4, 5A and 5B, manway cover mc and manway flange mf have respective circumferences C1, C2, which are ovoid, in this case, substantially circular. When manway mw is closed, that is, in the closed state, manway flange mf and manway cover mc are secured to each other by a plurality of manway cover fasteners b (which, although, removed for clarity, have been shown in the form of phantom lines in FIG. 2). A plurality of manway cover fasteners b are received through corresponding, circumferentially spaced holes h of predetermined size, holes h passing through both manway flange mf and manway cover mc.

In one possible implementation, clamping tool 21 is configured to be suitable for temporary or limited duration attachment to the manway, such as for accomplishing a short duration access or procedure with the associated manway. In such configuration, the components and features described herein for clamping tool 21 permit relatively quick and efficient installation on and removal from the associated manway. In one suitable installation operation, some or all of manway cover fasteners b may be loosened or removed, such that a gap can be created between the opposing portions of inward cover surface s5 and front flange surface s3. Inner jaws 29 may then be inserted in such gap. Thereafter, clamps 23, 25 may be removably secured to manway cover me and manway flange mf, respectively.

In the implementation of FIGS. 1-4, 5A, and 5B, there are two of the clamp fasteners 35 in the form of male, protruding pins from outer jaws 31 of clamps 23, 25 extending substantially through corresponding holes h in manway cover me and manway flange mf. There can be fewer or greater numbers of clamp fasteners 35, depending on the size and configuration of clamps 23, 25. In the illustrated implementation, clamp fasteners 35 are sized or otherwise configured to engage some of the holes h of predetermined size formed in manway cover mc or manway flange mf, as the case may be. In such implementations, there is no need to alter the diameter, size, threads, or other configuration of holes h which have been formed of predetermined size for the associated manway mw. Clamp fasteners 35 may be of any suitable form, including unthreaded pins as shown in FIGS. 1-4, 5A and 5B, but also may include threaded pins, threadably received bolts, and threaded through-bolt-and-nut assemblies.

Clamp fasteners 35, such as the protruding pins of the illustrated implementations, may be formed integrally with outer jaws, welded, soldered or otherwise permanently connected to portions of outer jaws 31 opposable to the manway cover mc or the manway flange mf, or releasably connected thereto, such as being threadably received, press-fit, or otherwise retained in apertures formed in outer jaws 31 (that is, female connections on outer jaws 31) or engaged around studs extending from outer jaws 31 (that is, male connections on outer jaws 31).

Clamp fasteners 35 are sized or configured to form a snug or interference fit with holes h with which they are engaged, so as to help resist shear or other forces caused by gravity acting on manway cover mc when it is separated from manway flange mf. As such, when pins are used as clamp fasteners 35, as shown, such pins are described as "hole size," meaning they correspond to the diameter of holes h. Typical diameters for holes h include 1¼ inch, 1⅜ inch, and 1½ inch. The cylindrical or outer surfaces of fasteners 35 which may engage opposing surfaces of holes h may include knurls, textured, or roughened surfaces, or fine threads to help with engagement, especially in the event the holes h include rust, paint, or other contaminants to be overcome for engagement of clamp fasteners 35.

Alternately, taper tap bolts may be used as clamp fasteners 35 themselves or may be run into holes h to clean or tap them, such use being in conjunction with engagement by clamp fasteners 35 when in the form of the aforementioned pins. Such taper tap bolts include longitudinally extending sluts cut like a tap, with a taper similar to a bottoming tap. Chamfer would be selected to accomplish recommended thread engagement of a threaded clamp fastener 35 or equivalent.

Still further variations to clamp fasteners 35 are possible, such as an expansion, anchor type design.

As further installation steps, clamps 23, 25 have their respective inner and outer jaws 29, 31, selectively and temporarily secured to each other in a clamping arrangement around manway cover mc manway flange mf, respectively, by additional fasteners 36, such as threaded bolts, extending between partially or fully threaded apertures formed in inner and outer jaws 29, 31. Fasteners 36 may assume any number of alternate forms suitable for clamping the inner and outer jaws around the manway cover mc or manway flange mf. Clamping tool 21 may be uninstalled or removed from manway mw, and the manway may be reclosed, by reversing the foregoing installation steps.

Given the size and weight generally associated with manway covers, clamping tool 21 may include additional components and features to retain manway cover mc in position relative to manway flange mf when manway cover mc is sought to be separated therefrom. In the illustrated implementation, inner jaws 29 of clamps 23, 25 include transverse, jaw surfaces 39 which are configured to oppose and engage portions of circumferential edges e on corresponding circumferences C1, C2 of manway cover mc and manway flange mf, respectively. In the case of circular or ovoid circumferences C2, C2, as in the illustrated implementation, transverse, jaw surfaces 39 include arcuate jaw portions 41 which are matched to correspond to arcuate portions α on circumferential edges e. As such, arcuate jaw portions 41 extend over arc-lengths of the circumferential edges e and thereby oppose arcuate portions a along such arc-lengths. Such opposing arcuate surfaces, in turn, support alignment of manway cover mc relative to a central axis D of manway mw.

Inner jaws 29, in the illustrated implementation, also include respective lips 45 which extend over corresponding lip arc-lengths. Lips 45 extend radially inwardly between the opposing surfaces of manway cover mc and manway flange mf when clamps 23, 25 are secured thereto. When so positioned, lips 45 have engaging portions configured to extend and engage inward cover surface s5 of manway cover mc and front flange surface s3 of manway flange mf, respectively. Such engagement, in turn, may resist certain forces acting on clamping 21 when attached to manway mw. Such forces, for example, may arise in connection with relative movement of the manway cover mc relative to manway flange mf, and may include bending moments acting on clamping tool 21.

Inner and outer jaws 29, 31 include respective base portions 37 which are securable by means of the fasteners 36 discussed previously. Base portions 37 are configured and sized to be secured relative to circumferences C1, C2 of manway cover and manway flange, respectively, at respective locations radially outwardly from such circumferences.

The number of cover clamps 23 or manway flange clamps 25 can be varied depending on the application, as can the radial location of such clamps 23, 25 about circumferences C1, C2 of manway cover mc and manway flange mf. In the illustrated implementation, for example, manway flange clamp 25 is located so as to permit securement at a 3 o'clock position on manway flange mf, whereas cover clamp 23 is secured to manway cover me at a 12 o'clock position. As such, davit 49 and its components extend upwardly from a mast base location on manway flange clamp 25, then orthogonally adjacent the manway to cover clamp 23, which cover clamp is suitably suspended from a portion of davit arm 53.

Other variations are within the scope of the present disclosure. For example, referring now to FIG. 6, another implementation of a clamping tool is shown with reference numerals in the 100 series corresponding to similar components in clamping tool 21. As such, clamping tool 121 makes use of three of the clamp fasteners 135 located and arcuately spaced to engage three of the predetermined sized holes h. Unlike clamping tool 21, clamps 123, 125 of clamping tool 121 are connected to a hub 150 by a pair of arms 152. In addition, clamping tool 121 has each of its two clamps 123, 125 at substantially the same radial position on the manway mw. In such configuration, the two clamps 123, 125 substantially oppose each other when in the closed position, and rotatably separate from each other when manway cover mc is separated from manway flange mf by rotation about hub 150.

Figure 6:
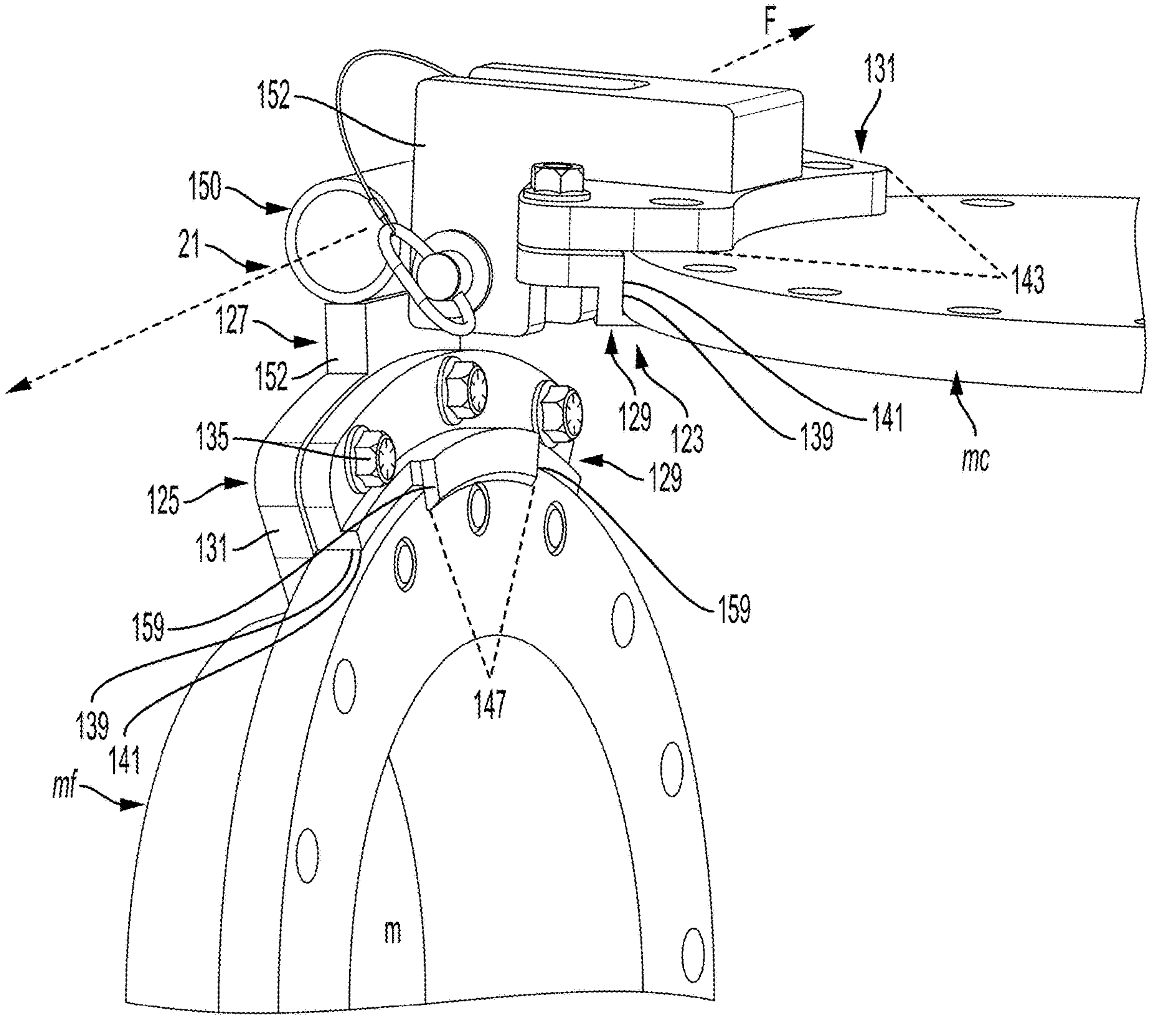
FIG. 6 is a partial, isometric view of another possible implementation of a clamping tool for a manway cover according to the present disclosure.

Hub 150 defines a single axis of rotation F about which clamps 123, 125 rotate relative to each other, although two or more parallel axes may likewise be suitable. In the implementation of FIG. 6, although clamps 123, 125 oppose each other, lips 145 of respective, inner jaws 129 have been configured to have their arc-lengths positioned to be arcuately offset relative to each other. In this way, lips 145 engage the opposing portions of manway cover mc and manway flange mf at different radially spaced locations when the clamping tool 121 is attached to manway mw. This permits lips 145 not only to engage corresponding inner surfaces of manway flange mf and manway cover mc, but also prevents lips 145 from interfering with each other when, after installation of clamping tool 21, manway cover mc is closed over or substantially adjacent to manway flange mf.

As yet another feature, lips 145 may be sized so that their engaging surfaces on manway flange mf and manway cover mc have respective side edges 159. Such side edges 159 of adjacent lips 145 may be arcuately located to abut each other when manway cover mc is closed. In this manner, such abutting side edges 159 may provide some additional support of the position of manway cover mc relative to manway flange mf when closed.

In one suitable implementation, lips 45, 145 extends over opposing portions of the manway cover and manway flange by ¼".

Clamping tool 21, 121 may have its dimensions adapted and configured so as to correspond to certain predetermined, manway diameters generally encountered in applications, facilities, or industries where such manways may be present, such as diameters of 16, 18, 20, and 24 inches. In those implementations where transverse jaw surfaces 39, 139 are formed with arcuate surfaces, clamping tool according to this disclosure may be in the form of a kit suitable for manway flanges and manway covers having the foregoing or still other predetermined diameters. Such predetermined diameters have corresponding arcuate, circumferential edges, as discussed previously. As such, clamping tool 21, 121, when in the form of a kit, would comprise four pairs of clamps 21, 23 or 121, 123, each of the pairs configured to be securable to a corresponding one of the aforementioned diameters. Inner jaws 29, 129 of the clamps would comprise a set of transverse, arcuate jaw portions having associated arc-lengths with radii corresponding to the various predetermined diameters, thereby permitting such arcuate jaw portions to engage a corresponding arcuate circumferential edge of corresponding manway covers and manway flanges of the various predetermined diameters for which the clamping tool set has been configured.

Still further variations in terms of the number of clamps the locations thereof are within the scope of this disclosure. For example, it may be desirable to have clamp tool 21 make use of one or more manway flange clamps 25 without cover clamps 23. Instead, a hoist, davit, or other frame member may interconnect the flange clamps 25 to the manway cover mc.

Figure 7:
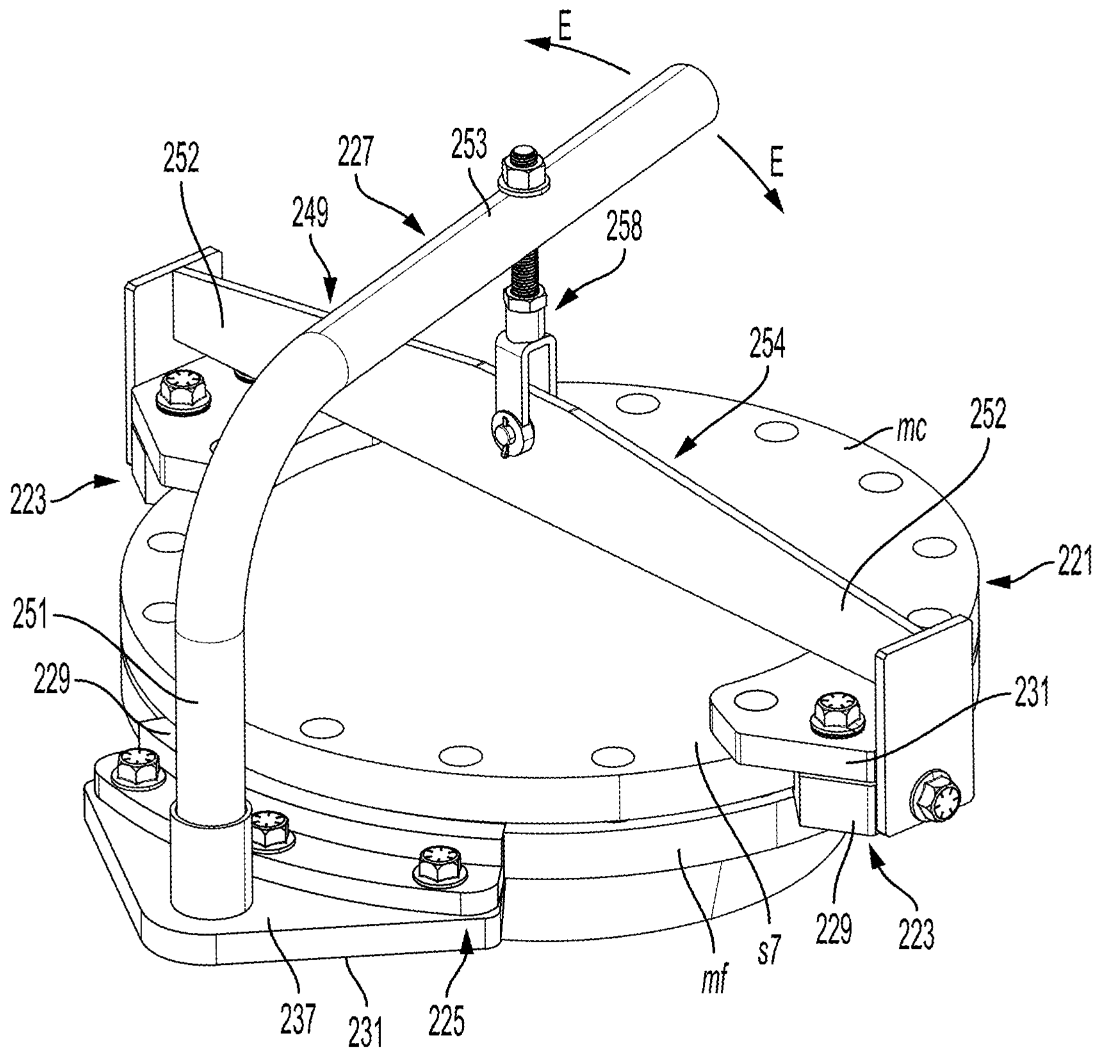
FIG. 7 is an isometric view of another possible implementation of a clamping tool according to the present disclosure.
Figure 8:
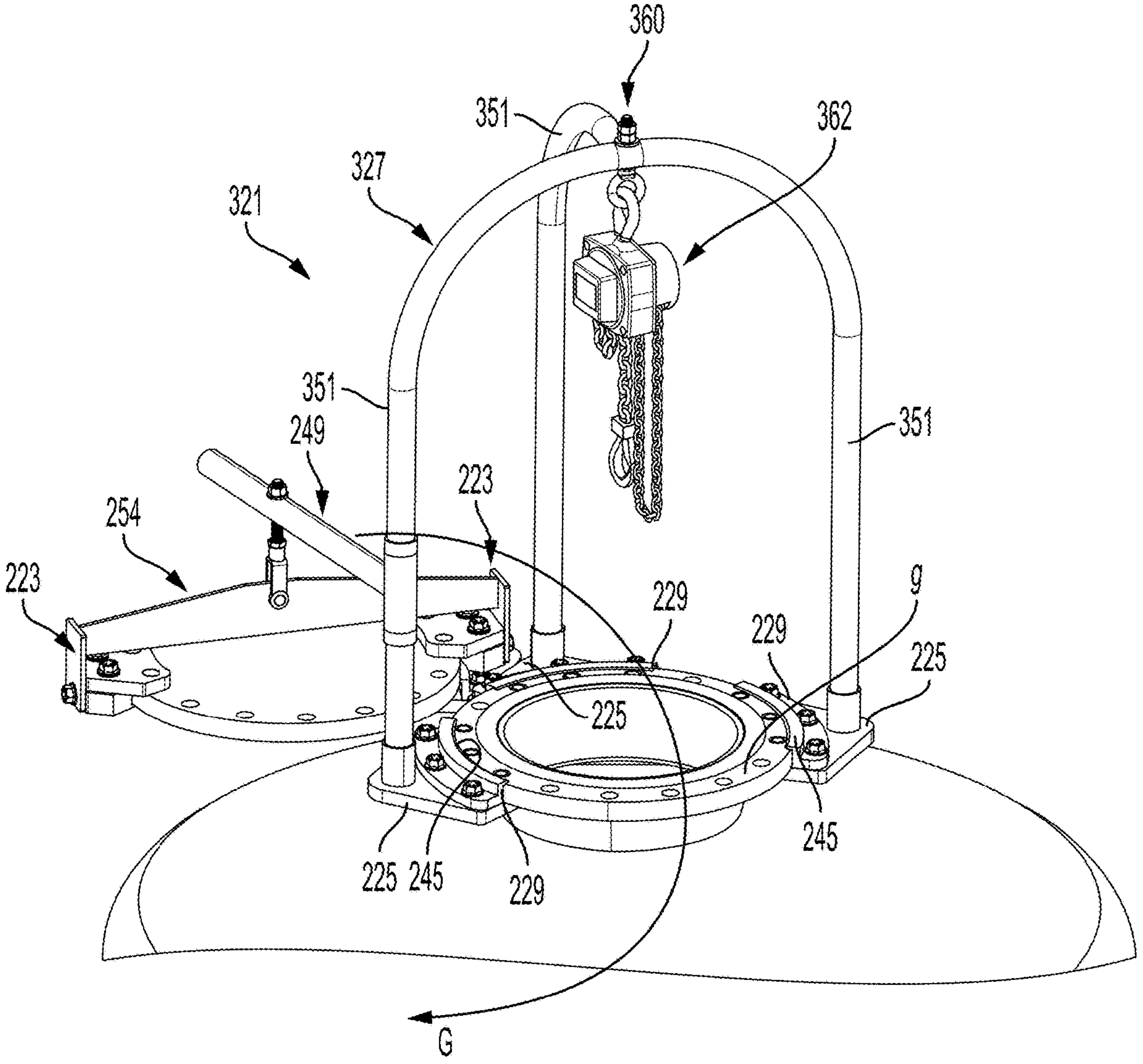
FIG. 8 is an isometric view of another possible implementation of a clamping tool according to the present disclosure.

In still further implementations, such as those shown in FIGS. 7 and 8, clamping tools of the present disclosure may be installed on manway flanges and covers of vessels, buildings, or environments in which manways are orientated non-horizontally, such as vertically or substantially vertically, relative to a plane of reference. In such environments or applications, the manway flanges are horizontal or substantially horizontal, as are their associated manway covers. FIG. 7 shows one exemplary implementation, in which reference numerals of elements similar to those of previous implementations are identified with the same numeral, but in the 200-299 numeric range.

As such, a clamping tool 221 makes use of a pair of manway cover clamps 223 which are removably securable to manway cover me at spaced, circumferential locations, such as at 180 degrees from each other. Cover clamps 223 are secured to respective arms 252 of a lift assembly 254. Lift assembly 254 has a midsection 256 between arms 252, which midsection 256, in turn, is secured by a suitable, length-adjustable connecting rod, bolt or similar interconnector 258, to a rotatable portion of a frame 227. Frame 227 is positionable and securable in operative proximity to the vertical manway.

Frame 227 may assume any configuration suitable for the non-horizontal (i.e., vertical) manway, including the form of a davit 249. Similar to the implementations of FIGS. 1-4, and 5A and 5B, davit 249 has a davit arm 253 extending orthogonally to a mast member 251. Davit 249 has sleeves or other rotatable interconnections relative to davit arm 253 to selectively swing davit arm 253 about a suitable axis, such as a longitudinal axis of mast member 251.

In the illustrated implementation of FIG. 7, davit arm 253 extends from a location proximate to the circumference of the vertical manway, radially inwardly across all or a portion of outward cover surface s7. Mast member 251 is rotatably connected relative to manway flange mf through a suitable base portion 237 of manway flange clamp 225. Cover clamps 223 and manway flange clamp 225 include respective, inner jaws 229 and outer jaws 231, with portions of inner jaws 229 insertable between opposing portions of manway cover mc and manway flange mf, as discussed previously with respect to implementations of FIGS. 1-4, 5A, 5B, and 6.

By virtue of the foregoing configuration, the adjustable interconnector 258 may be used to raise manway cover mc to separate it from underlying manway flange mf by a suitable amount, so that there is clearance between the inner jaw 229 of the cover clamp 223 and the inner jaw 229 of manway flange clamp 225, respectively. Once sufficient clearance has been formed, davit arm 253 may be rotated about mast member 251, in either of the directions shown by arrow E, to swivel or otherwise displace manway cover mc from its position overlying manway flange mf by a sufficient amount to allow access to the associated manway. In other words, clamping tool 221 is removably attachable to a manway flange and cover oriented in a horizontal plane to facilitate horizontal movement of the manway cover me to open the corresponding manway.

Lifting assembly 254 of clamping tool 221 may assume a variety of configurations beyond those shown in FIG. 7. For example, although the ends of lifting assembly arms 252 in the illustrated embodiment include outer jaws 231, alternately, such outer jaws 231 may be simplified, integrated, or otherwise dispensed with entirely, by virtue of corresponding features integrated at or connected to the ends of arms 252. For example, at the outer ends of arms 252, instead of outer jaws 231, a T-bar with two pins may simply be added to secure inner jaws 229 to arms 252, such configuration still permitting the vertical raising of manway cover mc by suitable actuation of the length adjustable interconnector 258.

Referring now to FIG. 8, another implementation suitable for use with a vertical manway mw includes clamping tool 321 with frame 327 configured with further functionality. In this implementation, frame 327 not only includes davit 249 interconnecting cover clamps 223 to manway flange clamp 225 to permit raising of manway cover mc and rotation thereof as described previously with reference to FIG. 7; but also frame 327 includes an extraction system 360 removably securable to manway flange mf by suitable manway flange clamps 225 at corresponding base portions of multiple mast members 351.

Manway flange clamps 225 include inner and outer jaws 229, 231, as described previously, which are removably connectable at corresponding arcuate locations to the circumference of manway flange mf. Frame 327 is secured to clamps 225 and extends upwardly or vertically relative to vertical manway mw. Frame 327 has a hoist or other suitable attachment mechanism 352 at its apex 360 to connect to a harness or to be otherwise suitably connected to a worker accessing, descending, ascending, or otherwise performing operations inside the manway or otherwise associated with the open manway. In one implementation, frame 327 is configured to provide or assist with safety or other occupational compliance aspects of personnel accessing the vertical manway.

In many applications, as shown by the exemplary implementation of FIG. 8, there is a suitable, resiliently compressible gasket, such as a rubber gasket g, extending around the circumference of the connection between manway flange mf and manway cover mc. The horizontal manways (and vertically oriented manway flanges mf and manway covers mc) of the implementations illustrated in FIGS. 1-4, 5A, 5B, and 6 may likewise have raised flanges or other surface treatments to receive gaskets therebetween.

The installation of the clamping tools disclosed herein, and corresponding operations thereof, are apparent from the foregoing description. With regard to FIGS. 7 and 8, manway flange clamps 225 are suitably installed around the circumference of manway flange mf. Inner jaws 229 extend between opposing surfaces of manway flange mf and manway cover mc. Depending on the application, installation of inner jaws 229 between the opposing surfaces of manway flange mf and manway cover mc may not require loosening of manway cover fasteners b. In such applications, lips 245 of inner jaws 229 may be able to be sufficiently inwardly compress gasket g radially inwardly, so as to permit clamping around manway flange mf. In other applications, with or without gaskets g, it may be more suitable to loosen manway cover fasteners b, as described with reference to implementations of FIGS. 1-4, 5A, 5B, and 6, sufficiently to form a gap to attach clamps 23, 123 and 25, 125.

Similar to the previous implementations, for vertical manways, cover clamps 223, including, at least inner jaws 229 thereof and, optionally, outer jaws 231, are removably secured to manway cover mc, again, with radially inwardly extending lips 245 of inner jaws 229 inserted between opposing surfaces of manway cover mc and manway flange mf. By suitable actuation of the length adjustment interconnector 258, inner jaws 229 of cover clamp 123 raise manway cover mc by a sufficient amount to clear opposing portions of inner jaws 229 of the cover clamps 223 and manway flange clamps 225.

In the case of frame 327, mast members 351 have been arcuately spaced to leave a sufficiently large opening, such as an opening extending over at least half the circumference of manway mw, such that davit arm 252 maybe swung in the clockwise direction indicated by arrow G, to open the manway mw. Thereafter, if a person needs to enter the manway, such as entry into a vessel, extraction mechanism 360 is operatively positioned above the now open manway mw and has been suitably secured by means of manway flange clamps 225, to permit hoisting a person into and out of manway mw.

It will be further understood that still further changes and variations in the details, materials, and arrangements of the components, parts, and features which have been described and illustrated may be made. All such modifications are deemed to be within the scope of this disclosure, as defined by the appended claims.

What is claimed is:

1. A clamping tool for separating a manway cover from an associated manway flange of a manway, the manway cover having inward and outward surfaces, the manway flange having rear and front flange surfaces, the front flange surface of the manway flange and the inward surface of the manway cover defining opposing portions when in a closed state, the clamping tool for a manway in which the manway cover and the manway flange have respective circumferences and, in the closed state of the manway, the manway flange and the manway cover are secured to each other by a plurality of manway cover fasteners received through corresponding, circumferentially spaced holes of a predetermined size, the holes passing through the manway flange and the manway cover the clamping tool comprising:
- a pair of clamps, one of the clamps removably securable to the manway flange and the other of the clamps removably securable to the manway cover; and
- a frame secured between the two clamps, the frame having portions interconnecting the two clamps to be moveable relative to each other;
- wherein each of the clamps have respective inner and outer jaws;
- wherein the inner jaws of each of the clamps are configured to be positionable between the opposing portions of the manway flange and the manway cover to retain the manway cover in position relative to the manway flange and permit selective separation therefrom;
- wherein one of the clamps comprises a cover clamp, the inner jaw of the cover clamp being configured to be removably securable to the inward surface of the manway cover;
- wherein the other of the clamps comprises a manway flange clamp, the inner jaw of the manway flange clamp configured to be removably securable to the front flange surface of the manway flange;
- wherein the outer jaw of the cover clamp is configured to be removably securable to the outward surface of the manway cover; and
- wherein the outer jaw of the manway flange clamp is configured to be removably securable to the rear flange surface of the manway flange; and
- wherein the clamps of the clamping tool are removably securable to the manway cover and the manway flange, respectively, by clamp fasteners configured to engage the holes of predetermined size of the manway cover and the manway flange.

2. The tool of claim 1, wherein the clamp fasteners are selected from the group consisting of unthreaded pins, threaded pins, threadably received bolts, and threaded through-bolt-and-nut assemblies.

3. The tool of claim 1, wherein the clamp fasteners are sized to engage the predetermined-sized holes without alteration of the predetermined size thereof.

4. The tool of claim 1, wherein the clamp fasteners comprise two of the clamp fasteners located and arcuately spaced to engage two of the predetermined-sized holes.

5. The tool of claim 1, wherein the clamp fasteners comprise three of the clamp fasteners located and arcuately spaced to engage three of the predetermined-sized holes.

6. The tool of claim 1, wherein the inner and outer jaws of the clamps include respective, base portions securable to each other, the base portions being configured to be secured relative to the circumference of the manway flange and the manway cover, respectively, at respective locations radially outwardly from the circumference of the manway.

7. The tool of claim 6, wherein the inner jaws of the clamps include respective, transverse, jaw surfaces configured to oppose and engage respective portions of the circumferential edges when the clamps are secured thereto.

8. The tool of claim 7, for a manway in which the circumference is selected from the group of circular and ovoid and therefore define arcuate portions on the circumferential edges, wherein the transverse jaw surfaces comprise arcuate jaw portions having arc-lengths configured to oppose the arcuate portions along the arc-lengths to support alignment of the manway cover relative to a central axis of the manway.

9. The tool of claim 8, wherein the inner jaws include respective lips extending over corresponding lip arc-lengths, the lips extending radially inwardly between the opposing portions of the manway cover and the manway flange when the clamps are secured thereto, the lips having engaging portions configured to extend and engage the inward surface of the manway cover and the front flange surface of the manway flange, respectively, to resist bending moments acting on the clamping tool when attached to the manway.

10. A clamping tool for separating a manway cover from an associated manway flange of a manway, the manway cover having inward and outward surfaces, the manway flange having rear and front flange surfaces, the front flange surface of the manway flange and the inward surface of the manway cover defining opposing portions when in a closed state, the clamping tool comprising:

a pair of clamps, one of the clamps removably securable to the manway flange and the other of the clamps removably securable to the manway cover; and a frame secured between the two clamps, the frame having portions interconnecting the two clamps to be moveable relative to each other;

wherein each of the clamps have respective inner and outer jaws;

wherein the inner jaws of each of the clamps are configured to be positionable between the opposing portions of the manway flange and the manway cover to retain the manway cover in position relative to the manway flange and permit selective separation therefrom;

wherein the frame includes a davit, the davit having a mast member and an arm extending orthogonally to the mast member, the mast being rotatable about an axis of rotation adjacent the manway, the arm extending adjacent the manway to swing out from the manway when the mast is suitably rotated;

wherein the cover clamp is connected to the davit arm; and wherein the manway flange clamp is connected to the mast.

11. A clamping tool for separating a manway cover from an associated manway flange of a manway, the manway cover having inward and outward surfaces, the manway flange having rear and front flange surfaces, the front flange surface of the manway flange and the inward surface of the manway cover defining opposing portions when in a closed state, the clamping tool comprising:

a pair of clamps, one of the clamps removably securable to the manway flange and the other of the clamps removably securable to the manway cover; and a frame secured between the two clamps, the frame having portions interconnecting the two clamps to be moveable relative to each other;

wherein each of the clamps have respective inner and outer jaws;

wherein the inner jaws of each of the clamps are configured to be positionable between the opposing portions of the manway flange and the manway cover to retain the manway cover in position relative to the manway flange and permit selective separation therefrom;

wherein the frame comprises a hub defining an axis of rotation adjacent the manway when the tool is secured thereto, the frame further comprising a pair of arms extending radially from the hub to attach to respective ones of the jaws, whereby the clamps are movable arcuately about the axis and relative to each other when the manway cover is opened and closed relative to the manway flange.

12. The tool of claim 11, wherein the hub defines not more than a single axis of rotation about which the clamps rotate, and wherein the arms connect the clamps in an opposing relationship so as to be adjacent each other when the manway cover is closed and the tool is attached thereto.

13. The tool of claim 12, for a manway in which the manway cover and the manway flange each have circumferences terminating in circumferential edges, wherein the inner and outer jaws of the clamps include respective, base portions securable to each other, the base portions being configured to be secured relative to the circumference of the manway flange and the manway cover, respectively, at respective locations radially outwardly from the circumference of the manway;

wherein the inner jaws of the clamps include respective, transverse, jaw surfaces configured to oppose and engage respective portions of the circumferential edges when the clamps are secured thereto;

wherein the transverse jaw surfaces comprise arcuate jaw portions having arc-lengths configured to oppose the circumferential edges to support alignment of the manway cover relative to a central axis of the manway;

wherein the inner jaws include respective lips extending over corresponding lip arc-lengths, the lips extending radially inwardly between the opposing portions of the manway cover and the manway flange when the clamps are secured thereto, the lips having engaging portions configured to extend and engage the inward surface of the manway cover and the front flange surface of the manway flange, respectively, to resist bending moments acting on the clamping tool when attached to the manway;

wherein the arc-lengths of the lips are arcuately offset relative to each other so that the lips engage the manway cover and the manway flange at respective, different, radially spaced locations when the tool is attached to the manway.

14. The tool of claim 13, wherein the engaging surfaces comprise respective side edges, and wherein the lips are located and the arc-lengths are sized to abut side edges of adjacent ones of the lips when the manway cover is closed, whereby the abutting side edges provide support of the position of the manway cover relative to the manway.

15. A clamping tool for separating a manway cover from an associated manway flange of a manway, the manway cover having inward and outward surfaces, the manway flange having rear and front flange surfaces, the front flange surface of the manway flange and the inward surface of the manway cover defining opposing portions when in a closed state, the clamping tool for use with manways having manway flanges and manway covers of predetermined diameters selected from the group consisting of 16, 18, 20, and 24 inches, the predetermined diameters terminating in corresponding, arcuate, circumferential edges, the clamping tool comprising:

a pair of clamps, one of the clamps removably securable to the manway flange and the other of the clamps removably securable to the manway cover; and a frame secured between the two clamps, the frame having portions interconnecting the two clamps to be moveable relative to each other;

wherein each of the clamps have respective inner and outer jaws;

wherein the inner jaws of each of the clamps are configured to be positionable between the opposing portions of the manway flange and the manway cover to retain the manway cover in position relative to the manway flange and permit selective separation therefrom;

four of the pairs of clamps, each of the pairs configured to be securable to a corresponding one of the manway covers and the manway flanges having the predetermined diameters;

wherein the inner jaws of each of the pairs of clamps have transverse, arcuate, jaw portions extending over associated arc-lengths, the arc-lengths having radii corresponding to respective ones of the predetermined diameters to engage the corresponding arcuate circumferential edges of the manway covers and the manway flanges of the predetermined diameters.

16. A clamping tool for separating a manway cover from an associated manway flange of a manway, in which the manway is oriented substantially vertically, the manway cover having inward and outward surfaces, the manway flange having rear and front flange surfaces, the front flange surface of the manway flange and the inward surface of the manway cover defining opposing portions when in a closed state, the clamping tool comprising:

a pair of clamps, one of the clamps removably securable to the manway flange and the other of the clamps removably securable to the manway cover; and a frame secured between the two clamps, the frame having portions interconnecting the two clamps to be moveable relative to each other;

wherein each of the clamps have respective inner and outer jaws;

wherein the inner jaws of each of the clamps are configured to be positionable between the opposing portions of the manway flange and the manway cover to retain the manway cover in position relative to the manway flange and permit selective separation therefrom;

wherein the frame comprises a base portion with a davit mast rotatably secured thereto and defining an axis of rotation adjacent the manway when the tool is secured to the manway, the frame having a davit arm connected to the davit mast and extending outwardly from the axis of rotation;

the tool further comprising a lift assembly with a length-adjustable interconnector connected to the davit arm, the lift assembly having at least two arms connectable to the manway cover at respective arcuately spaced locations;

wherein the tool comprises three of the clamps, the first and second clamps comprising manway cover clamps, the third clamp comprising a manway flange clamp, the frame interconnecting the manway cover clamps to be moveable relative to the manway flange clamp;

wherein the manway cover clamps are disposed at respective ends of the arms of the lift assembly and are removably securable to the manway flange;

wherein the manway flange clamp is disposed at the base portion of the frame and is removably securable to the manway flange;

wherein the interconnector is configured so that selective shortening thereof by a predetermined amount lifts the manway cover relative to the manway flange sufficiently to permit rotation of the davit mast to move the manway cover from over the manway flange to open the manway.

17. A clamping tool for lifting a manway cover from an associated manway flange of a vertically oriented manway, the manway cover having inward and outward surfaces, the manway flange having rear and front flange surfaces, the front flange surface of the manway flange and the inward surface of the manway cover defining opposing portions when in a closed state, the clamping tool comprising:

a plurality of manway flange clamps removably securable to the manway flange at respective arcuate locations about the manway flange, the manway flange clamps having inner jaws with lip portions insertable between the opposing portions of the manway flange and the manway cover;

a lift assembly having arms terminating in respective fingers, the respective fingers being insertable between the opposing portions of the manway flange and the manway cover at respective arcuate locations about manway cover;

a frame interconnecting the manway flange clamps and the lifting assembly;

wherein the frame comprises a base portion with a davit mast rotatably secured thereto and defining an axis of rotation adjacent the manway when the tool is secured thereto, the frame having a davit arm connected to the davit mast and extending outwardly from the axis of rotation;

wherein the lift assembly includes a length-adjustable interconnector connected to the davit arm;

wherein the manway flange clamp is disposed on the base portion of the frame;

wherein the interconnector is configured so that selective shortening thereof by a predetermined amount lifts the manway cover relative to the manway flange sufficiently to permit rotation of the davit mast to move the manway cover from over the manway flange to open the manway;

an extraction system secured to the frame and positionable above the manway when the manway flange clamps are secured to the manway flange, whereby the extraction system may be secured to personnel entering the manway after the manway has been opened.

18. A method for opening a manway comprising the steps of:

removably securing at least one manway flange clamp to a corresponding manway flange;

removably securing at least one manway cover clamp to a corresponding manway cover;

wherein the step of removably securing the manway flange clamp includes the steps of:

inserting first clamp fasteners through manway flange holes of a predetermined size formed on a rear surface of the manway flange, the insertion occurring without altering the predetermined size of the manway flange holes;

inserting a lip portion of the manway flange clamp between a front flange surface of the manway flange and an inward surface of the manway cover; and tightening the manway flange clamp to clamp the manway flange;

wherein the step of removably securing the manway cover clamp includes the steps of:

inserting second clamp fasteners through manway cover holes of a predetermined size formed on an outward surface of the manway cover, the insertion occurring without altering the predetermined size of the manway cover holes;

inserting a lip portion of the manway cover clamp between the inward surface of the manway cover and the front flange surface of the manway flange; and tightening the manway cover clamp to clamp the manway cover.

19. The method of claim 18, for a manway which has a gasket disposed between the manway flange and the manway cover and a resulting circumferential gap therebetween, and wherein the insertion steps comprise inserting the lip portions in the gap without first loosening any threaded bolts securing the manway cover to the manway flange.

* * * * *